US006850912B2

(12) United States Patent
Bleumer

(10) Patent No.: US 6,850,912 B2
(45) Date of Patent: Feb. 1, 2005

(54) METHOD FOR THE SECURE DISTRIBUTION OF SECURITY MODULES

(75) Inventor: Gerrit Bleumer, Velten (DE)

(73) Assignee: Francotyp-Postalia AG & Co. KG, Birkenwerder (DE)

(*) Notice: Subject to any disclaimer, the term of this patent is extended or adjusted under 35 U.S.C. 154(b) by 792 days.

(21) Appl. No.: 09/841,335

(22) Filed: Apr. 24, 2001

(65) Prior Publication Data

US 2002/0046175 A1 Apr. 18, 2002

(30) Foreign Application Priority Data

Apr. 28, 2000 (DE) ........................................ 100 20 904

(51) Int. Cl.[7] .............................. G06F 1/24; H04L 9/32

(52) U.S. Cl. ........................... 705/51; 380/49; 713/185; 713/156

(58) Field of Search ............................ 705/51; 380/49; 713/182, 156

(56) References Cited

U.S. PATENT DOCUMENTS

| | | | | |
|---|---|---|---|---|
| 5,153,842 A | | 10/1992 | Dlugos, Sr. et al. | |
| 5,636,277 A | * | 6/1997 | Nagahama | 705/59 |
| 5,786,587 A | * | 7/1998 | Colgate, Jr. | 235/487 |
| 6,289,452 B1 | * | 9/2001 | Arnold et al. | 713/175 |

FOREIGN PATENT DOCUMENTS

| | | | |
|---|---|---|---|
| DK | 19507044 A1 * | 1/1995 | G06K/19/073 |
| EP | 0 735 722 | 10/1996 | |
| EP | 0 845 762 | 6/1998 | |
| EP | 0 948 158 | 10/1999 | |
| WO | WO 98/57302 | 12/1998 | |

OTHER PUBLICATIONS

Ramaswamy, R. Dept. of Comput. Sci. and Telecommun., Missouri Univ., Kansas City, MO USA Computers and Electrical Engineering vol. 16, No. 1 p. 35–41 1990 USA Issn: 0045–7906–A Scheme for Providing Security Services in ISO–OSI Computer Network Architecture.*

* cited by examiner

*Primary Examiner*—James P. Trammell
*Assistant Examiner*—Daniel L Greene
(74) *Attorney, Agent, or Firm*—Schiff Hardin LLP

(57) ABSTRACT

In a method and a distribution system for the secure distribution of security modules, particularly for postage meter machines, for protecting against manipulation of security modules, only devices with security modules whose keys have not been comprised can be placed in operation by the customer under all circumstances, i.e. even when the cryptographic initialization at the production location has been comprehensively undermined. The generation and checking of markings, potentially in combination with certificates proceeds with a first marking of the shipping packaging of the security module ensuing at the manufacturing location after a first cryptographic initialization. The first marking is preferably a public key printed on a first label. A second marking ensues at the entry point remote from the manufacturing location upon registration of the packaging and enables an identification upon later registration of the device, triggered by the user located at the use location, before the loading of requested data into the postage meter machine.

36 Claims, 4 Drawing Sheets

METHOD FOR THE SECURE DISTRIBUTION OF SECURITY MODULES

BACKGROUND OF THE INVENTION

1. Field of the Invention

The present invention is directed to a method for the secure distribution of security modules, particularly for postage meter machines, from a manufacturing location via a distribution location and a user location. The invention also is directed to a distribution system for the secure distribution of security modules.

2. Description of the Prior Art

Like microprocessors and memory modules, security modules, particularly embedded systems can be manufactured in large numbers at central locations that are especially suited for mass production. Such security modules are utilized in various devices, particularly in those devices wherein specific values of their users are stored. Examples are postage meter machines, cash registers, electronic purses, PCs, notebooks, palmtops and mobile telephones. When these devices are likewise mass-produced goods, then the customer—the later user—is most comfortable acquiring these together with the appertaining security module directly by mail order or retail sales, usually without any further contact with the manufacturer of the security modules.

In order to assure a dependable cryptographic initialization and an efficient distribution of the security modules, the initialization should ensue at the production location. This would require central or decentralized initialization centers, that would be cost-intensive. In general, the production locations for mass products, and the locations of their subsequent operators that would be liable to damage due to compromised keys are in different countries, and thus, in different jurisdictions. Legal-based assertions between producers and operators of security modules are thus made more difficult from the very outset, however, it would be desirable to make them as rare as possible, or to avoid them entirely on the basis of measures that instill technical confidence. If there were manufacturing sources that the user does not trust, then there would be a security problem. To allow the subsequent operator to inspect the production process would be impractical and costly.

Various models of postage meter machines currently in the marketplace are equipped with a postal security device having a security module. This essentially serves for storing and accounting electronic postage fees and for generating electronic signatures for generating valid franking imprints (indicia). The security module must, obviously be protected against any and all type of manipulation during production, during transport and when used. This usually currently ensues with mechanical protective measures such as a closed housing around the security module. Moreover, every produced security module is cryptographically initialized and registered (certified) before it can be placed into use. Since, however, this preferably ensues at the location at which the security module is produced, the security demands of national postal authorities such as the U.S. Postal Service are not met. These demand an assurance for the security of security modules during transport as well and before initialization, particularly a registration at the final user of the postage meter machine or at a national service center. This, however, requires the establishment of national service centers and means an increased outlay for time, equipment, packaging and other handling.

SUMMARY OF THE INVENTION

An object of the present invention is to provide a method and a distribution system for the distribution of cryptographically initialized security modules with which, for protection against manipulation under the supervision of the later operator of the security module, it should be assured under all circumstances, i.e. even given a comprehensive compromise of the cryptographic initialization at the production location, for example given large-scale bribery of the personnel, that only devices with security modules whose cryptographic keys have not been compromised can be placed in operation by the customer.

This object is inventively achieved by a method operating on the basis that a successful protection against manipulation with fraudulent intent can be achieved by producing and checking specific markings, possibly in combination with corresponding certificates. A first marking ensues at the location of the manufacturer in a manufacturer's center following a first cryptographic initialization of the security module. The first marking is preferably a public key printed on a first label, and the label is preferably applied to the shipping packaging of the security module, or of a device having an integrated security module. The first marking can contain the electronic key to be sent in unencrypted or encrypted form, dependent on whether the key to be sent is a public key or a private (secret) key. The encryption can, for example, ensue by means of a hash algorithm.

A second marking ensues remote from the place of manufacture at a distribution center in a distribution location, or a facility referred to as an import point that is provided for a specific region or a specific country. The second marking ensues upon import and registration of the packaging with the security module. This enables an identification of the packaging during later registration of the security module, triggered by the user situated at the place of employment before requested data can be loaded onto the security module, or before the postage meter machine and before the postage meter machine can be used. The identification code generated at the distribution location is stored for this purpose in a remote, central data bank.

The verification inventively ensues with a verification code that is generated from the identification code and from the electronic key stored in the security module. A digital signature or an authentification code, for example a MAC (message authentification code), is preferably employed.

The inventive method and the inventive distribution system assure a dependable distribution of security modules, whereby the devices, for example postage meter machines, packaged customized and including the already-installed security modules, or the separately distributed and/or separately packaged security modules, need not be unpacked at the distribution location or at the import point. It is thereby especially economical to have a single, central import point in a country or in a region through which all packaged devices or security modules are imported. This import point can be regularly inspected by the operator with justifiable outlay or even can be operated by the operator. Unpacking and inspecting all incoming devices or security modules at this import point, which would be very complicated, inventively is no longer required.

Preferably the manufacturing center applies a label to the packaging of the security module, an electronic key being printed thereon in encrypted or unencrypted form, for example as a bar code. This machine-readable marking is then read by the distribution center or at the import point and is employed for identification, whereupon a second label with the identification code is applied to the packaging. This is either glued over the first label or the first label is removed, so that it can no longer be read subsequently in any case, particularly by a user. The identification code also can be applied on the label encrypted or unencrypted as a bar code. Instead of labels with bar codes, other possibilities for sending or applying the electronic key and/or the identification code to the packaging or to the security module itself are conceivable, such as, for example, chip cards, magnetic strip cards or ID tags. It is again preferred that the electronic key stored by the manufacture is erased by the distribution center or at the import point and is replaced by the identification code.

In a further embodiment of the invention, the use of an authentification algorithm and a single electronic key is provided at the manufacturer. Such an authentification algorithm can be part of a MAC (message authentification code). Additionally, this electronic key can be stored in the security module and sent simultaneously with the security module in a form capable of being read from the outside, on the basis of a single key known only to the manufacturer or to a manufacturer's center and a service center in the region of the user. The electronic key, which is then stored on the security module, is likewise known to the user and can be employed later for encryption of further information, for example, between the user and the service center.

Alternatively, an electronic key pair having a private and a public key is employed in a further embodiment. This is generated with a digital signature algorithm such as, for example, a RSA (Rivest Shamir, Adleman), a DSA (digital signature algorithm) or a ECDSA (elliptic curve DSA). The public key is preferably stored in the central data bank which the distribution center and the service center also can access and is sent in externally readable form with the security module, whereas the private key is stored only in the security module and is shipped together with it. An electronic key pair composed of a private key and a public key can likewise be employed for producing certificates with which the security module can be identified and that enhance the protection against manipulation. A separate electronic key pair can be provided at the manufacturer's center as well as in the distribution center.

Alternatively to a central data bank wherein specific electronic keys, the identification code and possibly generated certificates are stored in encrypted or unencrypted form, these can be communicated from the manufacturer's center to the distribution center and/or the regional service center via a separate network, stored in the security module or in some other way, for example with a data carrier that is mailed. This has the advantage that the central data bank, which preferably contains the data of all globally utilized security modules, only has to meet lower security demands, or can be fashioned smaller or can be entirely eliminated.

The invention, of course, also can be used when there are separate manufacturers or manufacturer's centers for the security module and the application device, for example the postage meter machine. The security modules are then sent to the manufacturer of the postage mater machine in the described way, where the security module can be identified and registered and can be subsequently installed into the postage meter machine. The inventive method also can be used when shipping the postage meter machine equipped with the security module.

DESCRIPTION OF THE PREFERRED EMBODIMENTS

Figure 1:
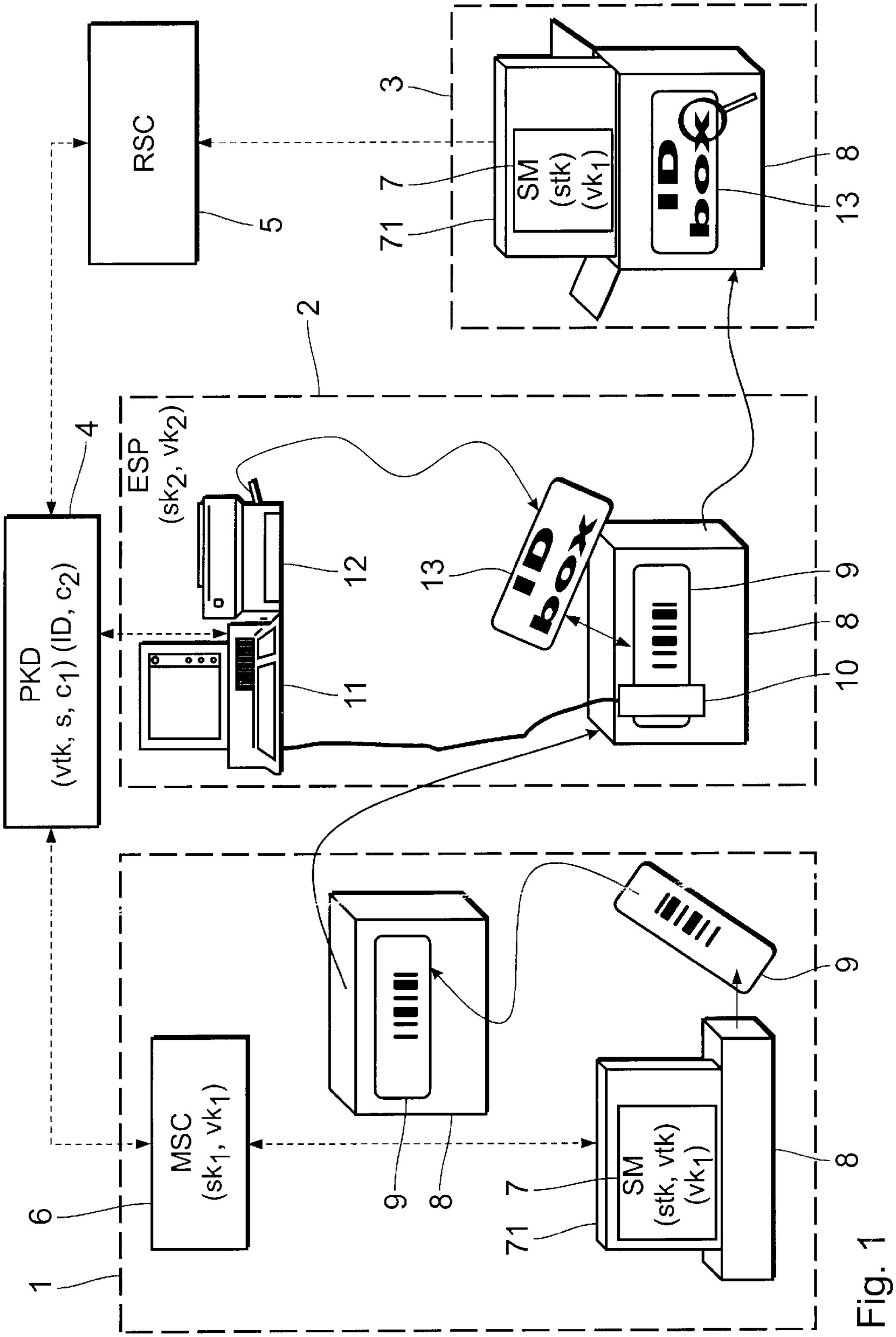
FIG. 1 is a block circuit diagram of a first embodiment of an inventive distribution system.

The inventive distribution system shown in FIG. 1 has the following basic units:

a) A manufacturer or manufacturer's center 1 at which a security module 7 and, potentially, postage meter machines are manufactured has a manufacturing service center 6 (MSC), which means a server operated in or close to the factory of the manufacturer 1. A printer or a chip card write/read device is connected to the server, so that newly produced security modules can be cryptographically initialized.

b) a distributor or distribution center 2 at a distribution location, also referred to as an entry service point (ESP), is provided in every region in which devices with security modules 7 are to be operated. There can thereby be one or more such service centers 2 that register all devices with security modules 7 for this region. For example, all devices with security modules 7 that are to be sold in a region can be delivered to distribution center 2 of this region, can be registered thereat and can be subsequently delivered to the appertaining customers.

c) A user 3 at a user location, which is understood as final consumer, acquires a device with installed security module or acquires the two devices separately and works therewith.

d) A central data bank 4 (PKD=Public Key Directory) serves as a worldwide list of all fabricated security modules and specific attributes of these security modules. There can be one or more distributed data banks.

e) There are one or more service centers 5 (RSC=Remote Service Center) in each region, which are understood as regional servers that offer services (remote services) for all devices with security modules registered in this region. The regional server or service 5 can be spatially located in the distribution center 2 of the region.

Further, there can be a regional operator in each region who operates all devices with security modules in this region, whereby this can also be a postal authority. The regional operator is the operator who is liable for damages that result from the compromise of a security module that is registered in this region. It is assumed due to this liability that the regional operator trusts the distribution center of his region, i.e. that, for example, the regional operator regularly inspects it, or has it inspected.

Figure 2:
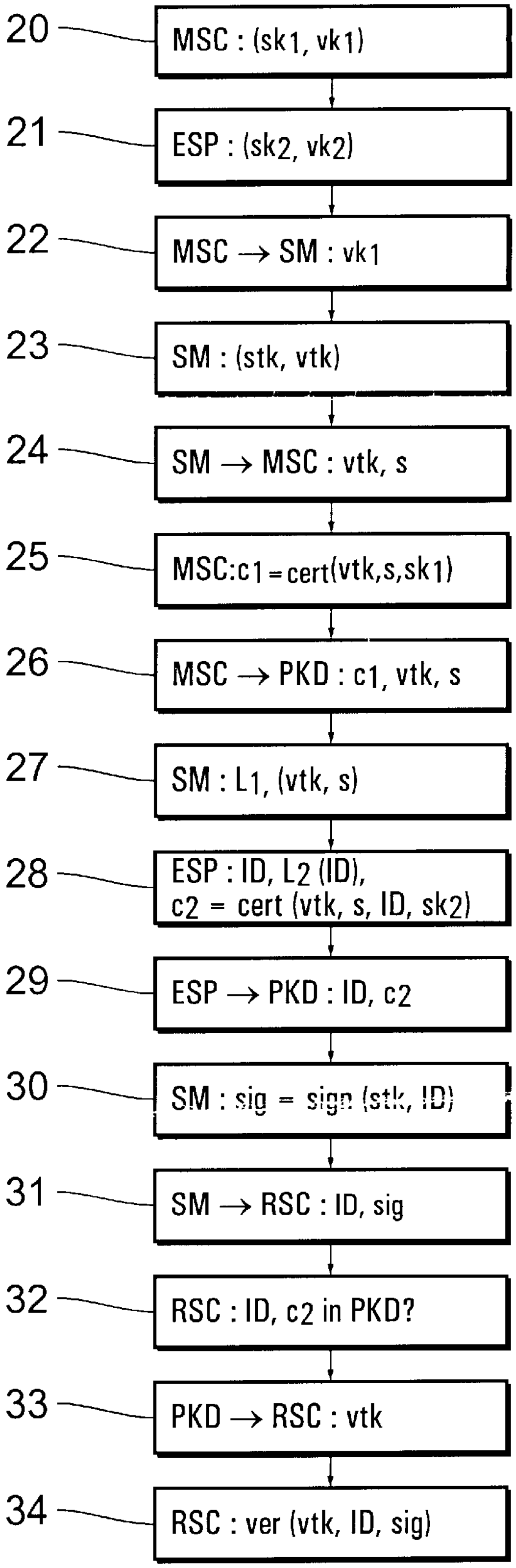
FIG. 2 is a flow chart for explaining the inventive method given a distribution system according to FIG. 1.

The inventive method is explained in greater detail below. The manufacturing center 1, i addition to manufacturing the security module 7, operates a local manufacturer server (manufacturing service center) 6 in the immediate proximity of the production end point of the factory. First, the manufacturer server 6 generates an electronic manufacturer key pair ($sk_1$, $vk_1$) (Step 20 in FIG. 2 ). The private key $sk_1$ is thereby used by the manufacturer server 6 in order to sign messages or newly produced security modules 7, whereas the pubic key $vk_1$ is used by the service centers 5 for verifying these signatures. For this purpose, the public key $vk_1$ can be communicated from the manufacturer server 6 offline to the distribution center 2 and/or the regional service center 5. One or more certifying authorities can be provided in order to authenticate this transmission channel.

The distribution center 2, which serves as the import point for all security modules to be operated in a specific region, also initially generates a distributor key pair ($sk_2$, $vk_2$) with a private key $sk_2$ and a public key $vk_2$ (Step 21). Items referred to as entry certificates thus can be generated for th security modules as digital signatures that can be stored in the central data bank 4. The various distributor centers of the different regions or countries do not know the public distribution keys of the other distribution centers. Each distribution center need only be in the position of being able to check its own entries in the central data bank 4. It is also fundamentally possible to provide a number of distribution centers 2 or import points for a country or a region.

After a security module 7 has been manufactured and provided with the mechanical protection devices, it is connected to the manufacturer server 6, for example via an intervening registration PC (not shown). This requests a public key from the security module 7, whereby the request contains the public manufacturer key $vk_1$ and the request to produce a transport key pair (Step 22). The security module 7 stores the key $vk_1$ in a non-volatile memory and generates the requested transport key pair (stk, vtk) that contains a signing transport key stk and a verifying transport key vtk (Step 23). Whereas the private key stk is kept private by the security module 7 and is only stored thereat, the security module 7 forwards a unique serial number S, that was assigned during manufacture, and the verifying transport key vtk to the manufacturer server 6 via the registration PC (Step 24). This subsequently generates a public key certificate $c_1$ (Step 25) with the assistance of a private key $sk_1$ and a signing algorithm cert, this being subsequently stored in the public, remote central data bank 4 (Step 26) together with the serial number S and the verifying transport key vtk. After this initial registration, the security module 7 will never again output its verifying transport key vtk; thus a storing thereof is also not required.

There are suitable products such as, for example, a client-server architecture on the basis of Windows NT that are available for the realization of the registration PC.

Subsequently, the security module 7 is packaged in a transport packaging 8. The security module 7 can be contained in a separate packaging or together with a user device 71, for example a postage meter machine, in a common packaging 8. In the latter instance, the security module 7, as shown in FIG. 1, can also already be installed into the postage meter machine 71. After the packaging 8 has been closed and sealed, a label 9 is produced on which the serial number s, the verifying transport key vtk of the security module 7 and, possibly, further information are printed, preferably in the form of a two-dimensional bar code (Step 27). This label 9 is applied onto the packaging 9 so as to be visible and readable from the outside, so that the information contained therein can be read in a simple way with a machine, for example with a bar code reader. If the labels 9 are not rugged enough in order to withstand transport, the bar codes can be printed directly onto the packaging or shipping papers that are then applied in a corresponding sleeve at the outside of the packaging 8.

The packagings are subsequently sent from the manufacturer center 1 directly to the distribution center 2 in the respective regions wherein the postage meter machines 71 or the security modules 7 are then to be sold and used. The bar codes of every incoming packaging 9 are read at the distribution center 2 with a scanner 10 that is connected to a corresponding computer 11 with a connected printer 12. An identification code ID is subsequently randomly selected for each serial number s and each verifying transport key vtk, even when the ultimate consumer of the product is neither known already or identified. The number of customer numbers must thereby be large enough so that conflicts (duplications) of the identification codes are extremely rare and it is practically impossible to guess which identification code has been assigned to a specific security module. The use of identification codes having a length between 32 and 64 bits is therefore preferable.

Subsequently, the distribution center 2 operates the new identification code ID with the serial number s and the verifying transport key vtk on the packaging, in that the identification code ID is printed onto a new label 13 that is glued over the first label 9 on the packaging 8, so that the bar code of the first label 9 can no longer be read. To that end, the first label 9 alternatively can be removed before the label 13 is glued on. If the label or the bar code is attached to accompanying papers, the new label 13 is applied at this location. Preferably, the identification code ID is applied on the label 13 in normally readable form, whereby the exact format should take the properties of the input unit of the postage meter machine to be equipped with the security module into consideration. When, for example, the input unit has a number field, then the identification code ID can also be printed in decimal numbers. If, however, the input unit has only a number of specific, for example differently colored keys, then the identification code should be encoded in a corresponding way. Moreover, the distribution center 2 generates an entry certificate c2 from the serial number s, the verifying transport vtk and the identification code ID with the assistance of a private distributor code $sk_2$ using a signing algorithm cert (Step 28). This, finally, is stored together with the identification code ID in the central data bank 4 and is allocated thereat to the already-stored data of the security module (Step 29).

In terms of concept, the central data bank is a large distributed list that centrally administers all public verifying keys of security modules for postage meter machines in all countries. Access to this global data bank 4 is strictly limited, with read and write accesses being limited to the service center 5, 6 and the distributor centers 2. The distributor centers 2 and the service centers of each region thus have access only to the keys that relate to the security modules operated in their region.

All packagings 8 with security modules processed in this way are subsequently directly marketed by the distribution centers 2 or distributed via retail merchants. In general, the distribution centers 2 do not know who the final consumer ultimately is, what product the consumer will receive nor when the consumer will receive it.

After a customer 3 has received a package 18 and removed the security module 7, it will be installed into the postage meter machine 71 insofar, as shown, it is not already installed, the interrupt operation will cease, and the machine 71 is connected to the telephone network. The postage meter machine 71 is then connected to a regional service center 5 of its region in order to be registered thereat. To that end, the security module 7 first generates a verification code sig from the private key stk stored in the security module 7 and from the identification code ID contained on the label 13 (Step 30). This verification code sig together with the identification code ID is then transmitted to the regional service center 5, which subsequently searches in the central data bank 4 to determine whether the transmitted identification code ID has been generated by the distributor 2 of this region and whether a valid entry certificate $c_2$ is present (Steps 31, 32). Insofar as this is the case, the regional service center 5 receives a verification key vtk back from the central data bank 4 (Step 33), this then being used for the verification of the security module on the basis of the verification algorithm ver with reference to the generated verification code sig and the identification code ID (Step 34).

When this test is successful, the security module 7 and the appertaining postage meter machine 71 have been registered and released for use, whereupon the country-specific software, initialization and authorization can be downloaded. Subsequently, the security module is recognized as postal security device (PSD), so that the postage meter machine can be placed into operation, can download fee units and can generate frankings. As is apparent from the above explanation, it is not necessary in the invention that the packaging 8 of the security module 7 be opened on the route from the manufacturer to the ultimate consumer. Accordingly, seals can be attached to the packaging 8, so that an unauthorized opening of the packaging during transport can be easily detected by the user. As a result of employing in the described certificates and the described labels, extensive protection against manipulation with fraudulent intent is also achieved. Further, the security module 7 only can be placed into operation when the verification and registration at the end of the described method proceeds successfully.

Fundamentally, a distribution system must meet a number of security demands and offer protection against various manipulations. These are described in brief below:

1. A tamperer could compromise the private transport key stk of a security module and log on at a regional service center with a PC in the same way as a security module. After the tamperer has logged on, initialized and authorized, it could have a suitable key pair under his control in order to generate an arbitrary number of frankings in arbitrary amounts. The compromising could ensue by the private transport key being stolen during the manufacturing process, or public transport keys could be tapped during transmission via a network, or the mechanical protection devices of a security module can be broken open. Moreover, such a tamperer could directly steal security modules from the manufacturer.
2. A tamperer could also generate his own transport keys and transfer these into the system by coupling to a manufacturer service 6 or a regional service center 5. The transport of verifying keys of new security modules could also be interrupted by a tamperer. In this case, the system would not "notice" a difference between the number of manufactured security modules and the number of transport keys. Since the tamperer then knows a private transport key that mates with a public transport key, the tamperer is in the same position as someone who compromises a private transport key.
3. A tamperer could also steal a complete security module that is equipped with a transport key before it is delivered to the customer. The tamperer could then use this in order to generate frankings in a specific country.
4. Finally, a tamperer could manufacture his own security modules and slip them into the distribution chain. However, the tamperer would then have to be able to successfully introduce public transport keys into the system, since his security modules would otherwise not be accepted.

The inventive method and the inventive distribution system can withstand all of these described misuses other than having the security module stolen from the customer and having the mechanical security devices broken open or the public transport key thereby becoming available to the tamperer. Given the inventive solution, a tamperer must obtain not only a registered key pair of transport keys but also an appertaining identification code. If a tamperer only obtains the registered transport key pair and, possibly, a security module, it is still necessary that the tamperer have an identification code therefor produced at the distributor. Otherwise, no identification code is entered into the central data bank and a registration or use will not ensue properly. After the distribution center generates an identification code and has stored it in the central data bank, a tamperer could also attempt to read this out from the central data bank or to intercept the security module on its transport path to the user in order to get the identification code. It should be noted that only authorized persons can order a packaging 8 with a security module 7 and a label with identification code.

The described, inventive distribution system has a distributed data bank with the highest security level that must be adequately protected against unauthorized access. This is assured because the infrastructure is a closed system without access possibility via the Internet.

Intercepting a packaging with a label on the distribution routes is generally considered adequately difficult. The number of shipments of security modules is relatively slight and it is also not possible to read a public transport key from a label without a bar code scanner. It is even more difficult when the label with the identification code is glued over the first label.

The most serious form of attempted fraud is probably the compromising of a large number of private transport keys at the manufacturer and comparing their public transport keys to the same number of packages that are placed on the store shelves in order to find at least a single coincidence. This type of fraud only functions when the tamperer can somehow recognize which packages on the store shelves coincide with which packages coming from the manufacturer. This could ensue in that a tamperer reads out the public transport key stored on the first label at the distribution center in some way or other before the second label is glued thereover. Another possibility would be the secret marking of packages at the manufacturer in order to be able to relocate the same packages later.

All of the described possible misuses, however, are suppressed or largely avoided given the inventive distribution system and method, so that the security measures that are provided can be evaded only given extremely great outlay.

Figure 3:
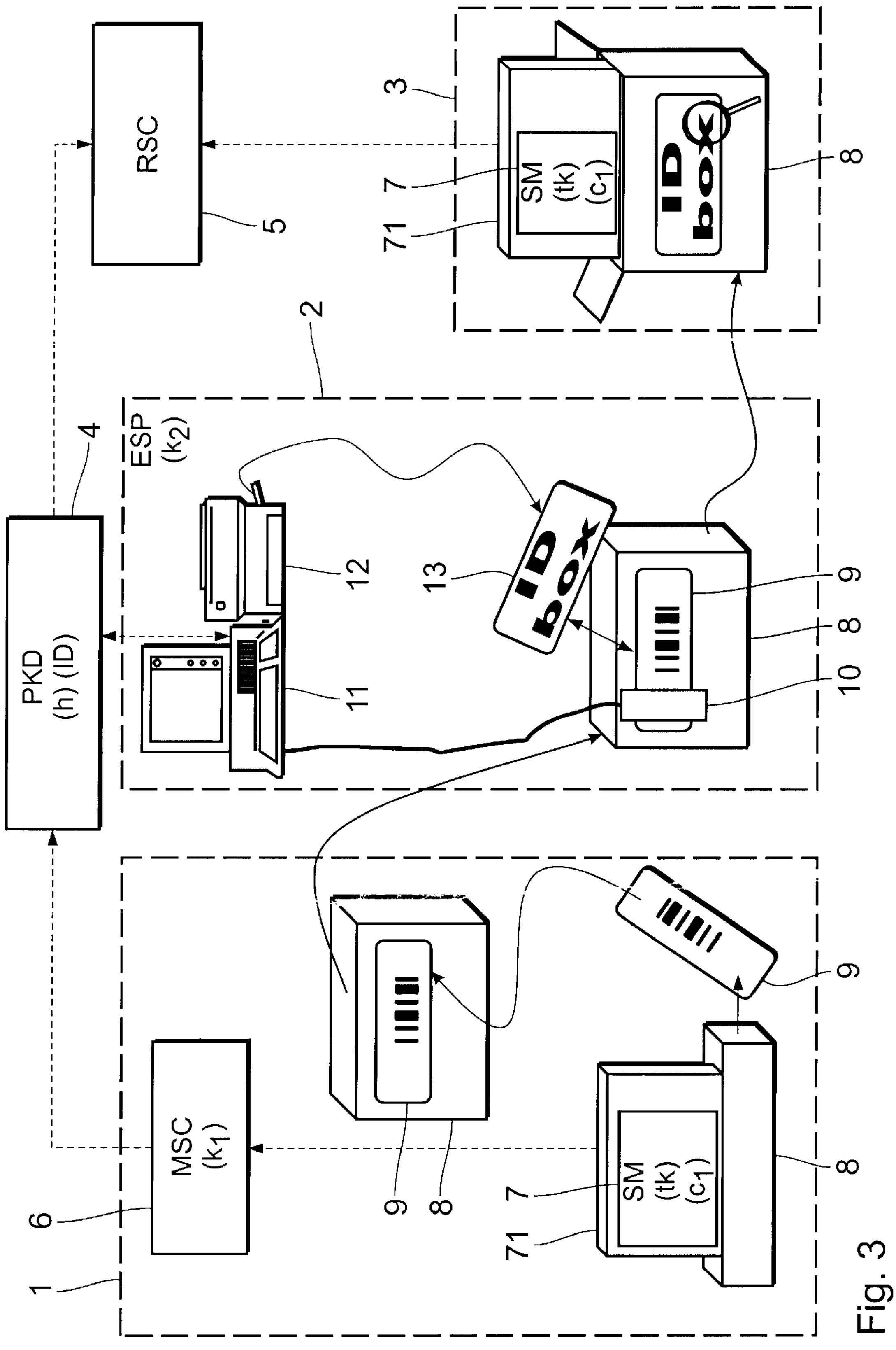
FIG. 3 illustrates a second development of an inventive distribution system.
Figure 4:
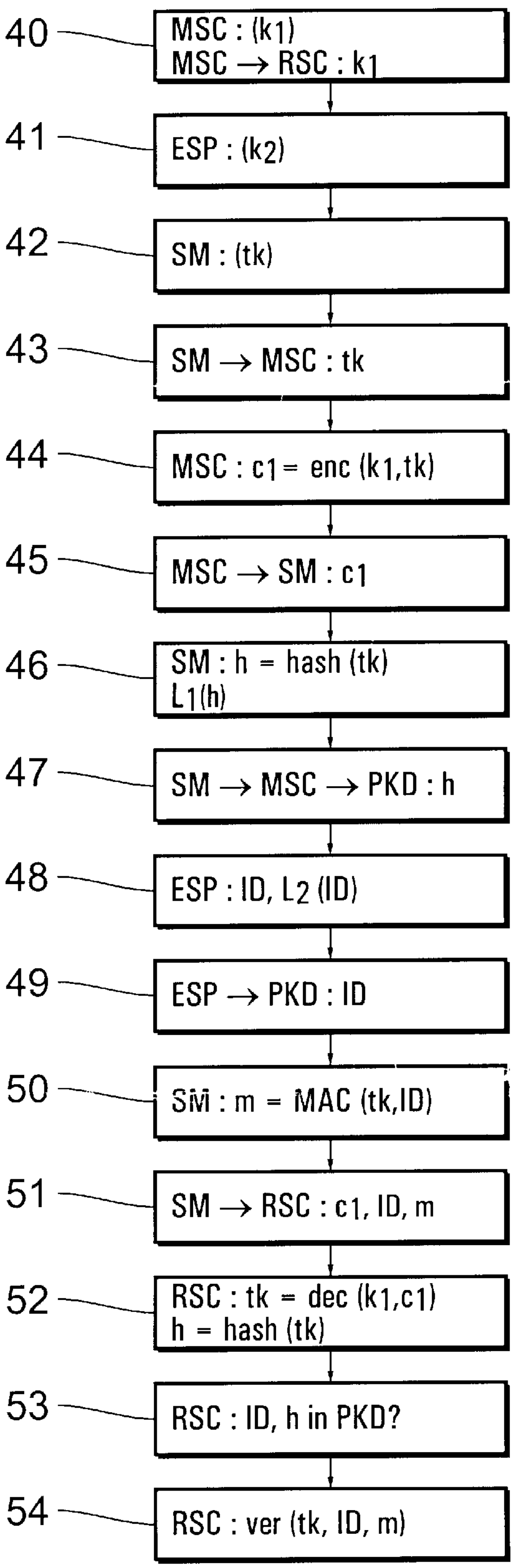
FIG. 4 is a flow chart for explaining the inventive method given a distribution system according to FIG. 3.

A second embodiment of the inventive distribution system and of the inventive method shall be explained on the basis of FIGS. 3 and 4. Differing from the distribution system according to FIG. 1, this does not employ key pairs having a private and a public key but only one symmetrical key is respectively utilized. First, the manufacturer server 6 generates a private key $k_1$ that is declared with the regional service center 5 (Step 40). Likewise, the distribution center 2 generates its own private key $k_2$ and the security module 7 generates a transport key tk (Steps 41, 42). After the security module 7 has communicated the transport key tk to the manufacturer server 6 (Step 43), this encrypts the transport key tk with the assistance of its private key $k_1$ on the basis of an encryption algorithm enc and sends the certificate $c_1$ back to the security module 7 (Steps 44, 45). The security module 7 stores the certificate $c_1$, produces a hash value h from the transport key tk and prints this onto the label 9, which is then applied to the packaging 8 of the security module 7 (Step 46). Finally, this hash value h is entered into the central data bank 4 as well via the manufacturer server 6 (Step 47).

At the distribution center 2, the hash value h is read from the label 9 with the scanner 10, an identification code ID is generated and printed onto the second label 13, which is then applied over the label 9 on the packaging 8 (Step 48). The identification code ID is likewise stored in the central data bank 4 and is allocated therein to the hash value h (Step 49).

At the user location 3, the security module 7, after it arrives, generates a verification code M, also referred to as MAC (message authentication code), from the transport key tk that is stored in the security module and from the identification code ID of the label 13 with an authentification algorithm (Step 50). This verification code m together with the identification code ID and the certificate $c_1$ is transmitted to the regional service center 5 (Step 51). Thereat, the certificate $c_1$ is decrypted with the assistance of a private key $k_1$ using a decryption algorithm dec, the transport key tk deriving therefrom, a hash value h being subsequently calculated therefrom (Step 52). Subsequently, the regional service center 5 checks whether the identification code ID and the hash value h are contained in the central data bank 4 (Step 53). Insofar as this is the case, finally, the verification ensues with the verification algorithm ver with the assistance of the transport key tk, of the identification code ID and of the verification code m (Step 54). Given successful verification, the registration can then ensue whereupon the security module can be employed as intended.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for the distributing security modules in a secure manner from a manufacturing location via a distribution location to a user location, comprising the steps:

a) generating and storing an electronic key in a security module at the manufacturing location;

b) transmitting the electronic key together with the security module to the distribution location, with the electronic key being visible in externally readable form at said security module;

c) generating an identification code allocated to the electronic key at the distribution location and transmitting the identification code from the distribution location to a central data bank and storing the identification code at the central data bank, and after generating the identification code, making the electronic key in externally readable form unreadable at the distribution location and shipping the security module from the distribution location with the identification code in externally readable form;

d) using the security module at the user location, and generating a verification code from the identification code and the electronic key stored in the security module;

e) at a service center, verifying that the verification code, and the identification code and the electronic key obtained from the central data bank, belong together; and f) upon verification by the service center, registering said security module for use at said user location.

2. A method as claimed in claim 1 wherein step (c) comprises physically attaching at least one of said electronic key and said identification code to said security module for shipment with said security module.

3. A method as claimed in claim 2 comprising physically attaching at least one of said electronic key and said identification code to said security module in machine-readable form.

4. A method as claimed in claim 3 comprising physically attaching at least one of said electronic key and said identification code to said security module as a bar code.

5. A method as claimed in claim 3 comprising physically attaching at least one of said electronic key and said identification code to said security module as a data carrier.

6. A method as claimed in claim 5 comprising selecting said data carrier from the group of data carriers consisting of chip cards, magnetic strip cards, and identification tags.

7. A method as claimed in claim 1 comprising installing said security module in a device, and wherein step (c) comprises physically attaching at least one of said electronic key and said identification code to said device.

8. A method as claimed in claim 7 comprising physically attaching at least one of said electronic key and said identification code to said device in machine-readable form.

9. A method as claimed in claim 8 comprising physically attaching at least one of said electronic key and said identification code to said device as a bar code.

10. A method as claimed in claim 8 comprising physically attaching at least one of said electronic key and said identification code to said device as a data carrier.

11. A method as claimed in claim 10 comprising selecting said data carrier from the group of data carriers consisting of chip cards, magnetic strip cards, and identification tags.

12. A method as claimed in claim 1 comprising packaging said security module in transport packaging and step (c) comprises physically attaching at least one of said electronic key and said identification code to said transport packaging.

13. A method as claimed in claim 12 comprising physically attaching at least one of said electronic key and said identification code to said transport packaging in machine-readable form.

14. A method as claimed in claim 13 comprising physically attaching at least one of said electronic key and said identification code to said transport packaging as a bar code.

15. A method as claimed in claim 13 comprising physically attaching at least one of said electronic key and said identification code to said transport packaging as a data carrier.

16. A method as claimed in claim 15 comprising selecting said data carrier from the group of data carriers consisting of chip cards, magnetic strip cards, and identification tags.

17. A method as claimed in claim 1 comprising installing said security module in a device and packaging said device in transport packaging, and wherein step (c) physically attaching at least one of said electronic key and said identification code to said transport packaging of said device.

18. A method as claimed in claim 13 comprising physically attaching at least one of said electronic key and said identification code to said transport packaging in machine-readable form.

19. A method as claimed in claim 18 comprising physically attaching at least one of said electronic key and said identification code to said transport packaging as a bar code.

20. A method as claimed in claim 18 comprising physically attaching at least one of said electronic key and said identification code to said transport packaging as a data carrier.

21. A method as claimed in claim 20 comprising selecting said data carrier from the group of data carriers consisting of chip cards, magnetic strip cards, and identification tags.

22. A method as claimed in claim 1 where step (e) comprises entering said identification code into said security module for generating said verification code.

23. A method as claimed in claim 1 comprising providing a manufacturing center at the manufacturing location for at least partially fabricating said security module, providing a distribution location at said distribution center for packaging said security module with said identification code in externally readable form and for distributing the packaged security module, and providing said service center for supplying said security module with a fee unit to said user location.

24. A method as claimed in claim 1 wherein step (a) comprises generating a single electronic key with an authentification algorithm.

25. A method as claimed in claim 24 comprising allowing said single electronic key o be known only at said manufacturing location and at said service center.

26. A method as claimed in claim 1 wherein step (a) comprises generating an electronic key pair, comprised of a private key and a public key, with a digital signature algorithm and employing said electronic key pair as said electronic key.

27. A method as claimed in claim 26 comprising storing only said public key at said central data bank, and wherein step (b) comprises transmitting only said public key in externally readable form with said security module to said distribution location, and storing only said private key in said security module, and wherein step (e) comprises using said private key stored in said security module for generating said verification code.

28. A method as claimed in claim 27 wherein step (f) comprises employing said private key and said public key for registering said security module.

29. A method as claimed in claim 1 comprising encrypting data at said central data bank, and providing said manufacturing location and said service center with a key for decrypting data encrypted at said central data bank.

30. A method as claimed in claim 1 comprising packaging said security module in a sealed package at said manufacturing location, and maintaining said sealed package in sealed form until said sealed package is at said user location.

31. A method as claimed in claim 1 comprising also storing said electronic key at said central data bank.

32. A method for the distributing security modules in a secure manner from a manufacturing location via a distribution location to a user location, comprising the steps:

a) generating and storing an electronic key in a security module at the manufacturing location;

b) transmitting the electronic key together with the security module to the distribution location, with the electronic key being visible in externally readable form at said security module;

c) generating an identification code allocated to the electronic key at the distribution location and storing the identification code in said security module, after generating the identification code, making the electronic key in externally readable form unreadable at the distribution location and shipping the security module from the distribution location with the identification code in externally readable form;

d) using the security module at the user location, and generating a verification code from the identification code and the electronic key stored in the security module;

e) at a service center, verifying that the verification code, and the identification code and the electronic key obtained from the security module, belong together; and f) upon verification by the service center, registering said security module for use at said user location.

33. A method for the distributing security modules in a secure manner from a manufacturing location via a distribution location to a user location, comprising the steps:

a) generating and storing an electronic key in a security module at the manufacturing location;

b) making the electronic key available via a network;

c) transmitting the electronic key together with the security module to the distribution location, with the electronic key being visible in externally readable form at said security module;

d) generating an identification code allocated to the electronic key at the distribution location and making the identification code available via said network, after generating the identification code, making the electronic key in externally readable form unreadable at the distribution location and shipping the security module from the distribution location with the identification code in externally readable form;

e) using the security module at the user location, and generating a verification code from the identification code and the electronic key stored in the security module;

f) at a service center, verifying that the verification code, and the identification code and the electronic key obtained from the network, belong together; and g) upon verification by the service center, registering said security module for use at said user location.

34. A distribution system for distributing security modules in a secure manner, comprising:

a manufacturing center for generating and storing at least one electronic key in a security module and for storing said electronic key in a central data bank and for shipping the electronic key together with the security module with the electronic key in externally readable form;

a distribution center which receives the security module from the manufacturing center, for generating an identification code allocated to the electronic key and for storing the identification code at the central data bank, and, after generating the identification code, for making the electronic key in externally readable form unreadable, and for shipping the identification code in externally readable form together with the security module;

a user device supplied with said security module that is placed in operation after receiving the security module, and wherein said security module generates a verification code from the identification code and the electronic key; and a service center for verifying affiliation of said verification code, said identification code and said electronic key after obtaining said electronic key from said central data bank, and for registering said security module upon successful verification.

35. A distribution center as claimed in claim 34 wherein said distribution center includes said service center and wherein at least one of said distribution center and said service center are operated by a regional operator.

36. A distribution center as claimed in claim 34 wherein said distribution center is operated so that all security modules be used in a territorial region must pass through said distribution center before registration.

* * * * *